US012800411B2

(12) United States Patent
Nawaoka et al.

(10) Patent No.: US 12,800,411 B2
(45) Date of Patent: Nov. 17, 2026

(54) TEMPERATURE-SENSITIVE AND STRAIN-SENSITIVE COMPOSITE SENSOR

(71) Applicant: TDK CORPORATION, Tokyo (JP)

(72) Inventors: Kohei Nawaoka, Tokyo (JP); Ken Unno, Tokyo (JP); Masanori Kobayashi, Tokyo (JP); Tetsuya Sasahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 298 days.

(21) Appl. No.: 18/613,244

(22) Filed: Mar. 22, 2024

(65) Prior Publication Data

US 2024/0264013 A1 Aug. 8, 2024

Related U.S. Application Data

(63) Continuation of application No. PCT/JP2022/024342, filed on Jun. 17, 2022.

(30) Foreign Application Priority Data

Sep. 29, 2021 (JP) ................................ 2021-159782

(51) Int. Cl.

| | |
|---|---|
| ***G01L 1/22*** | (2006.01) |
| ***G01K 7/22*** | (2006.01) |
| ***G01L 1/18*** | (2006.01) |
| ***G01L 9/04*** | (2006.01) |

(52) U.S. Cl.

CPC .................. *G01L 1/22* (2013.01); *G01K 7/22* (2013.01); *G01L 1/18* (2013.01); *G01L 9/04* (2013.01)

(58) Field of Classification Search

CPC .... G01L 1/22; G01L 1/18; G01L 9/04; G01K 7/22

See application file for complete search history.

(56) References Cited

U.S. PATENT DOCUMENTS

| | | | | |
|---|---|---|---|---|
| 9,754,706 | B2 * | 9/2017 | Fujita | H01C 17/12 |
| 9,903,013 | B2 * | 2/2018 | Fujita | C23C 14/3414 |
| 2016/0320251 | A1 * | 11/2016 | Kieffer | G01K 7/18 |
| 2020/0348186 | A1 * | 11/2020 | Suzuki | H01C 7/04 |
| 2024/0117474 | A1 * | 4/2024 | Nawaoka | C23C 14/3464 |

(Continued)

FOREIGN PATENT DOCUMENTS

| | | | |
|---|---|---|---|
| EP | 4 317 926 | A1 | 2/2024 |
| JP | H03-133101 | A | 6/1991 |

(Continued)

OTHER PUBLICATIONS

JP-2022073444-A, English Translation (Year: 2022).*

(Continued)

*Primary Examiner* — Ryan D Walsh
(74) *Attorney, Agent, or Firm* — Oliff PLC

(57) ABSTRACT

A temperature-sensitive and strain-sensitive composite sensor includes a strain-sensitive resistive film and a temperature-sensitive resistive film. The strain-sensitive resistive film is represented by a formula of $Cr_{(100-x-y)}Al_xN_y$, and $5<x\leq50$ and $0.1\leq y\leq20$ are satisfied. The temperature-sensitive resistive film has an absolute value of temperature coefficient of resistance (TCR) of 2000 ppm/° C. or more in a temperature range of −50° C. or more and 450° C. or less.

8 Claims, 8 Drawing Sheets

(56) References Cited

U.S. PATENT DOCUMENTS

| | | | | |
|---|---|---|---|---|
| 2024/0255371 | A1* | 8/2024 | Kobayashi | G01L 1/26 |
| 2024/0271920 | A1* | 8/2024 | Ono | G01B 7/18 |
| 2024/0369429 | A1* | 11/2024 | Ogasa | G01L 1/2287 |
| 2025/0102380 | A1* | 3/2025 | Ono | G01L 1/2287 |

FOREIGN PATENT DOCUMENTS

| | | | | |
|---|---|---|---|---|
| JP | 2001-221696 | A | | 8/2001 |
| JP | 2002-048607 | A | | 2/2002 |
| JP | 2015-031633 | A | | 2/2015 |
| JP | 2018-091848 | A | | 6/2018 |
| JP | 2019-192740 | A | | 10/2019 |
| JP | 2022073444 | A | * | 5/2022 |
| WO | 2022/209963 | A1 | | 10/2022 |

OTHER PUBLICATIONS

Apr. 2, 2024 International Preliminary Report on Patentability issued in International Patent Application No. PCT/JP2022/024342.

Jul. 12, 2022 International Search Report issued in International Patent Application No. PCT/JP2022/024342.

Ozawa et al., "Electrical Properties of Cr—Al Alloy Thin Films," IEEE Transactions on Components, Hybrids, and Manufacturing Technology, Dec. 4, 1986, vol. CHMT-9, No. 4, pp. 391-395.

* cited by examiner

TEMPERATURE-SENSITIVE AND STRAIN-SENSITIVE COMPOSITE SENSOR

CROSS-REFERENCE TO RELATED APPLICATIONS

The present application is a continuation application of PCT application No. PCT/JP2022/024342 filed on Jun. 17, 2022, which claims priority to Japanese patent application No. 2021-159782 filed on Sep. 29, 2021. The disclosures of these applications are hereby incorporated by reference in their entirety.

BACKGROUND

The present disclosure relates to a temperature-sensitive and strain-sensitive composite sensor including a temperature-sensitive resistive film and a strain-sensitive resistive film.

As shown in Patent Document 1, known is a temperature-sensitive and strain-sensitive composite sensor that simultaneously detects the temperature and pressure of a measurement target such as a fluid. In particular, in Patent Document 1, it is reported that, by combining a strain-sensitive resistive film made of a Cr—N based alloy and a temperature-sensitive resistive film made of an Fe—Pd alloy, temperature and pressure can be detected simultaneously without requiring a Wheatstone bridge circuit for temperature compensation.

However, the gauge factor of the Cr—N based alloy film used in Patent Document 1 is extremely reduced in a high temperature region of 200° C. or more. That is, in the high temperature region of 200° C. or more, the accuracy of pressure measurement decreases. Thus, the usable range of the temperature-sensitive and strain-sensitive composite sensor of Patent Document 1 is limited to a range of 200° C. or less. In recent years, there has been a demand for simultaneous detection of temperature and pressure in a range from a low temperature region of −50° C. to a high temperature region of 450° C., and further improvement in the performance of temperature-sensitive strain-sensitive composite sensors is expected.

Patent Document 1: JP2001221696 (A)

SUMMARY

Preferably, a temperature-sensitive and strain-sensitive composite sensor comprises:

- a strain-sensitive resistive film represented by a formula of $Cr_{(100-x-y)}Al_xN_y$, $5<x\leq 50$ and $0.1\leq y\leq 20$ being satisfied; and
- a temperature-sensitive resistive film having an absolute value of temperature coefficient of resistance (TCR) of 2000 ppm/° C. or more in a temperature range of −50° C. or more and 450° C. or less.

BRIEF DESCRIPTION OF THE DRAWING(S)

DETAILED DESCRIPTION

In the present embodiment, a composite sensor 10 (FIG. 1), which simultaneously detects fluid temperature and fluid pressure, is described as an example of a temperature-sensitive and strain-sensitive sensor according to the present disclosure.

Figure 1:
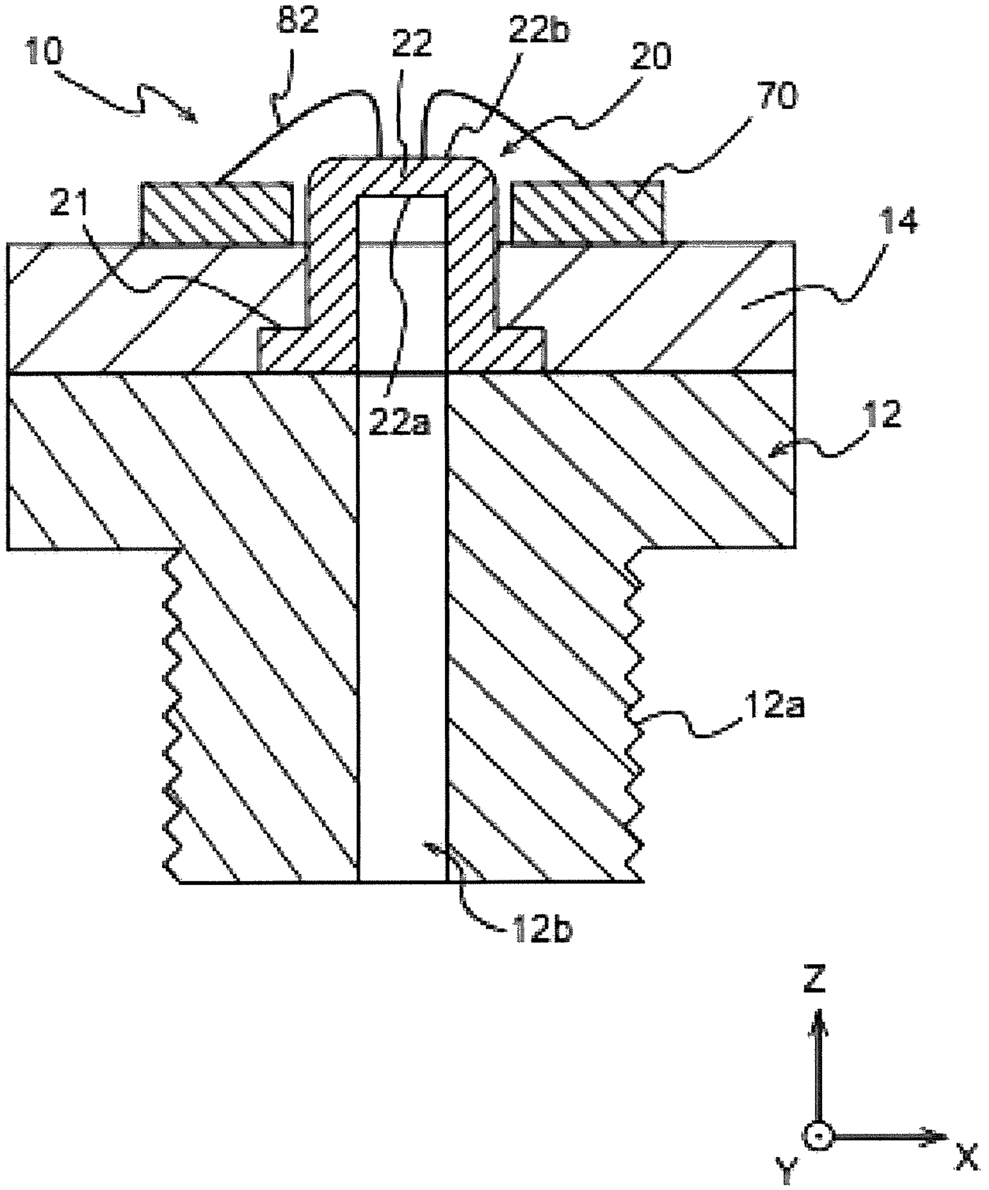
FIG. 1 is a schematic cross-sectional view of a temperature-sensitive and strain-sensitive composite sensor according to an embodiment of the present disclosure.

As shown in FIG. 1, the composite sensor 10 includes a membrane 22, which deforms in response to fluid pressure. The membrane 22 is constituted by an end wall formed at the upper end of a hollow cylindrical stem 20 in the Z-axis. The membrane 22, which is an end wall, is thinner than other parts of the stem 20, such as a side wall. Note that, the membrane 22 is not limited to the mode shown in FIG. 1 and may be formed of a flat substrate, such as a Si substrate. The lower end of the stem 20 in the Z-axis is an open end of a hollow portion, and the hollow portion of the stem 20 communicates with a flow path 12*b* of a connection member 12.

In the composite sensor 10, the fluid introduced into the flow path 12*b* is guided from the hollow portion of the stem 20 to an inner surface 22*a* of the membrane 22, and fluid pressure is applied to the membrane 22. The stem 20 including the membrane 22 can be made of, for example, a metal, such as stainless steel. Instead, the stem 20 may be made of a Si substrate processed into a hollow cylindrical shape by etching or may be formed by joining a flat Si substrate to another member.

A flange portion 21 is formed around the open end of the stem 20 so as to protrude outward from the axis of the stem 20. The flange portion 21 is sandwiched between the connection member 12 and a holding member 14, and the flow path 12*b* leading to the inner surface 22*a* of the membrane 22 is sealed.

The connection member 12 includes a screw groove 12*a* for fixing the composite sensor 10. The composite sensor 10 is fixed via the screw groove 12*a* to a pressure chamber or the like in which a fluid to be measured is sealed. Thus, the flow path 12*b* formed inside the connection member 12 and the inner surface 22*a* of the membrane 22 in the stem 20 are airtightly communicated with a pressure chamber in which a fluid to be measured exists therein.

A circuit board 70 is attached to the upper surface of the holding member 14. The shape of the circuit board 70 is not limited and can be, for example, a ring shape surrounding the stem 20 as shown in FIG. 1. The circuit board 70 includes, for example, a circuit to which signals related to temperature and strain detected by the membrane 22 are transmitted.

Figure 2:
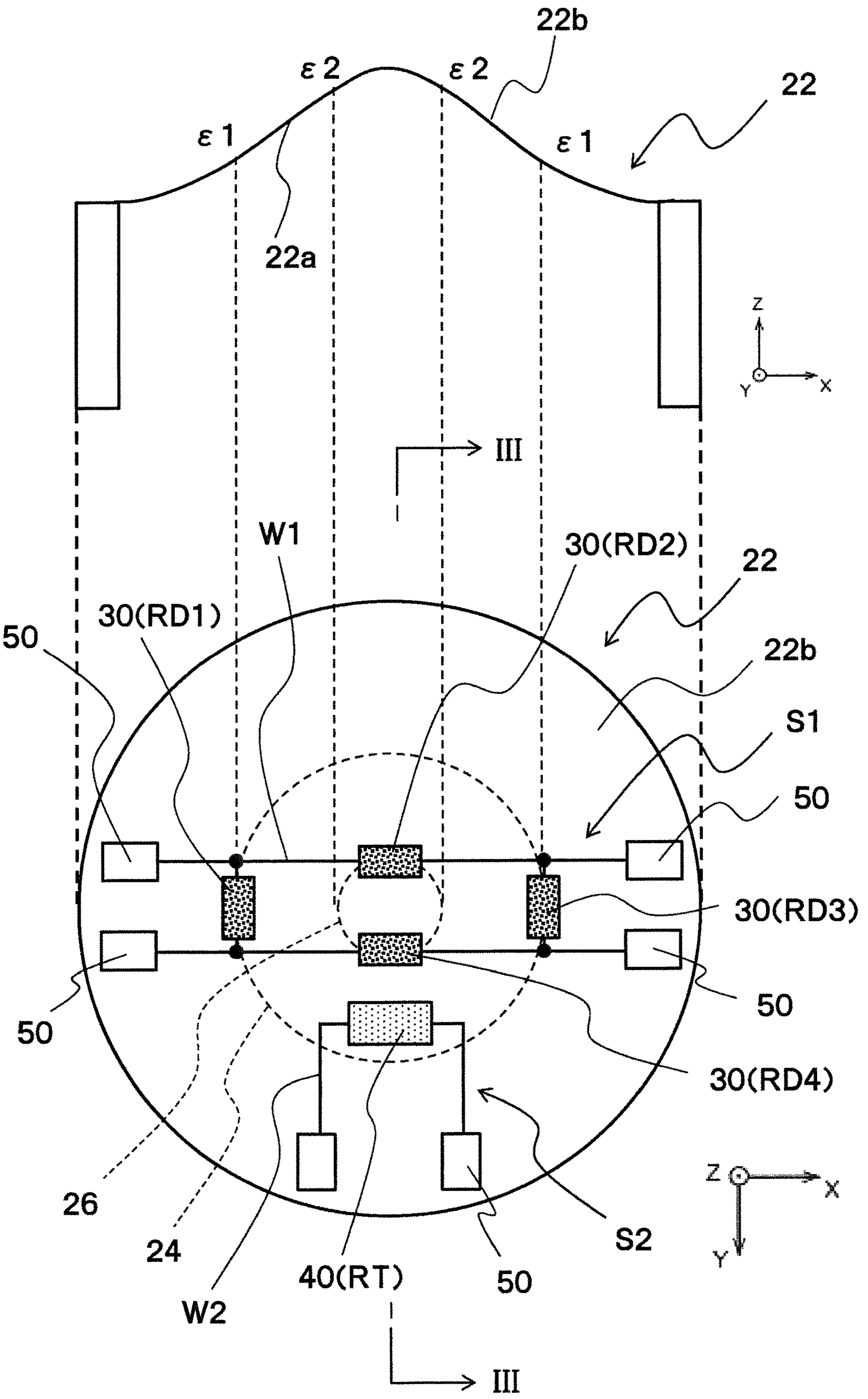
FIG. 2 is a conceptual diagram illustrating the arrangement of resistors in the temperature-sensitive and strain-sensitive composite sensor of FIG. 1.

As shown in FIG. 2, a strain measurement section S1 and a temperature measurement section S2 are provided on an outer surface 22*b* of the membrane 22. The strain measurement section S1 and the temperature measurement section S2 are electrically connected to the circuit board 70 via an intermediate wiring 82 by wire bonding or so, and the detection signals of the strain measurement section S1 and the temperature measurement section S2 are transmitted to the circuit board 70 via the intermediate wiring 82.

The strain measurement section S1 includes four strain-sensitive resistors RD1 to RD4, a wiring W1, and electrode portions 50. In the strain measurement section S1, a Wheatstone bridge circuit is formed by the four temperature-sensitive resistors RD1 to RD4. However, the strain measurement section S1 only needs to have at least one strain-sensitive resistor RD, and the number of strain-sensitive resistors RD is not limited. For example, two or more Wheatstone bridge circuits may be formed on an outer surface 22*b* of the membrane 22. In the strain measurement section S1, the resistance values of the strain sensitive resistors RD1 to RD4 change in accordance with the deformation of the membrane 22. Thus, the strain generated in the membrane 22, namely, the fluid pressure acting on the membrane 22, can be detected from the output of the Wheatstone bridge circuit.

Meanwhile, the temperature measurement section S2 includes a temperature-sensitive resistor RT, a wiring W2, and electrode portions 50. In the temperature measurement section S2, the temperature-sensitive resistor RT is electrically connected to the electrode portions 50 via the wiring W2. Although only one temperature-sensitive resistor RT is illustrated in FIG. 2, the number of temperature-sensitive resistors RT is not limited, and the temperature measurement section S2 may include a plurality of temperature-sensitive resistors RT. In the temperature measurement section S2, the resistance value of the temperature-sensitive resistor RT changes in accordance with the temperature change, and the temperature of the fluid guided to the inner surface 22*a* of the membrane 22 is detected based on this resistance change.

All of the temperature-sensitive resistor RT and the strain-sensitive resistors RD1 to RD4 are formed on the same plane of the outer surface 22*b* of the membrane 22. The strain-sensitive resistors RD1 to RD4 are formed by subjecting strain-sensitive resistive films 30 to microfabrication (patterning), and the temperature-sensitive resistor RT is formed by subjecting the temperature-sensitive resistive film 40 to microfabrication. That is, the strain-sensitive resistor RD is the strain-sensitive resistive film 30, and the temperature-sensitive resistor RT is the temperature-sensitive resistive film 40.

Figure 3:
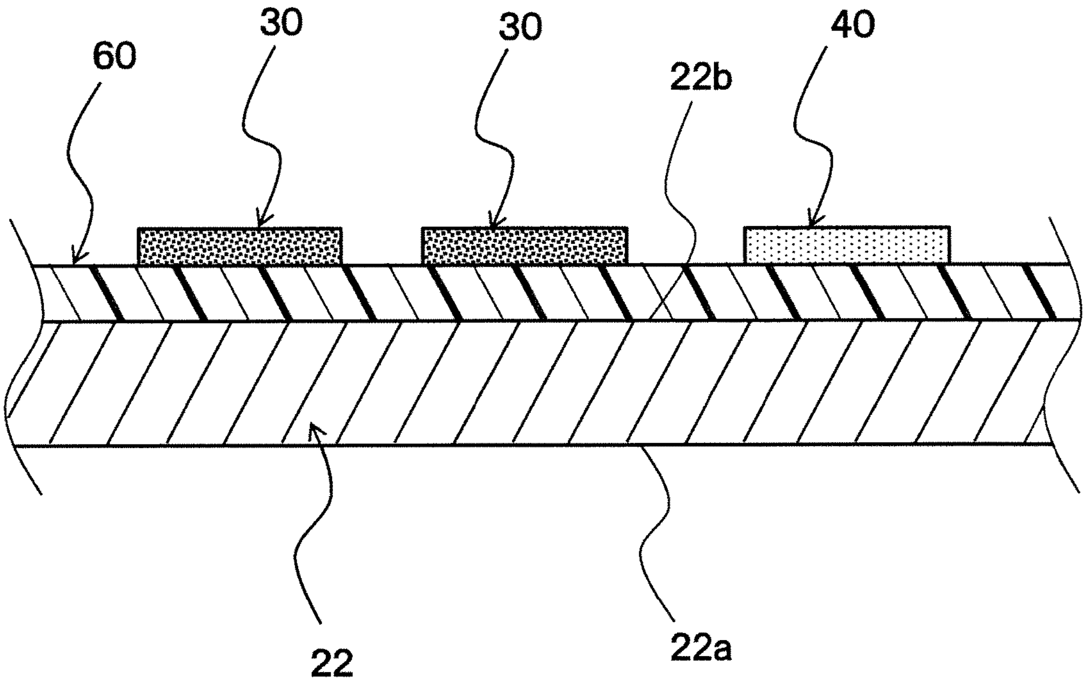
FIG. 3 is a schematic cross-sectional view along the line III-III shown in FIG. 2.

As shown in FIG. 3, the strain-sensitive resistive films 30 and the temperature-sensitive resistive film 40 are provided on the outer surface 22*b* of the membrane 22 with a base insulating layer 60 interposed therebetween. The base insulating layer 60 is formed so as to cover almost the whole of the outer surface 22*b* of the membrane 22. However, the base insulating layer 60 does not necessarily need to cover the whole of the outer surface 22*b*, and an uncovered portion that is not covered with the base insulating layer 60 may exist at the outer edge of the outer surface 22*b*.

The base insulating layer 60 only needs to have insulating properties, and the material of the base insulating layer 60 is not limited. For example, the base insulating layer 60 can be made of a silicon oxide such as $SiO_2$, a silicon nitride, a silicon oxynitride, or the like. When the membrane 22 is a Si substrate, the base insulating layer 60 may be a thermal oxide film formed by heating the Si substrate. The thickness of the base insulating layer 60 is preferably 10 μm or less, more preferably 1 to 5 μm. Note that, when the outer surface 22*b* of the membrane 22 has insulating properties, the resistive films 30 and 40 may be formed directly on the outer surface 22*b* of the membrane 22 without forming the base insulating layer 60.

Next, the characteristics of the strain-sensitive resistive film 30 and the temperature-sensitive resistive film 40 are described.

Note that, the temperature coefficient of resistance (TCR, unit: ppm/° C.) used in the description for each of the resistive films 30 and 40 means a change rate in resistance due to temperature change and is defined as TCR=A/R (25° C., 0με)×$10^6$, where A is a slope of change in resistance value in the range of −50° C. to 450° C., and R (25° C., 0με) is a resistance value at a temperature of 25° C. and a strain of 0με. The temperature coefficient of resistance of the strain-sensitive resistive film 30 is represented as $TCR_d$, and the temperature coefficient of resistance of the temperature-sensitive resistive film 40 is represented as $TCR_t$.

Also, the temperature coefficient of sensitivity (TCS, unit: ppm/° C.) used in the description for each of the resistive films 30 and 40 is a change rate in gauge factor (unit: dimensionless number) due to temperature change and is defined as TCS=B/$k_{25° C.}$×$10^6$, where B is a slope of change in gauge factor in the range of −50° C. to 450° C., and $k_{25° C.}$ is a gauge factor at 25° C. The gauge factor and temperature coefficient of sensitivity of the strain-sensitive resistive film 30 are represented as $k_d$ and $TCS_d$, and the gauge factor and temperature coefficient of sensitivity of the temperature-sensitive resistive film 40 are represented as $k_t$ and $TCS_t$.

(Strain-Sensitive Resistive Film 30)

The strain-sensitive resistive film 30 is represented by a formula of $Cr_{(100-x-y)}Al_xN_y$, and the composition regions of x and y are 5<x≤50 and 0.1≤y≤20, respectively. When the strain-sensitive resistive film 30 has such a composition, in the temperature range of −50° C. or more and 450° C. or less, a gauge factor $k_d$ higher than that of a normal metal thin film is obtained, and the change in the gauge factor $k_d$ due to temperature change can be reduced. Thus, when the strain-sensitive resistive film 30 having the above-mentioned composition is employed in the composite sensor 10, strain (pressure) can be detected with high accuracy in the temperature range of −50° C. or more and 450° C. or less.

In the above-mentioned CrAlN based strain-sensitive resistive film 30, the Al content is particularly important, and the composition range of x is preferably 25<x≤50, more preferably 25<x≤40.

Changes in characteristics due to changes in the composition of the strain-sensitive resistive film 30 can be reduced by controlling the N content within a predetermined range and setting the Al content to more than 25 at %. More specifically, when the Al content is more than 25 at %, the change rate of $TCR_d$ with respect to the change in Al content of 1 at % can be reduced to less than 5%. That is, variations in composition during manufacturing can be tolerated within an appropriate range, and good productivity is obtained. Also, since variations in $TCR_d$ can be reduced, the accuracy of strain measurement by the strain-sensitive resistive film 30 can be further improved.

Also, the gauge factor $k_d$ of the strain-sensitive resistive film 30 can be higher by controlling the N content within a predetermined range and setting the Al content to 50 at % or less, more preferably 40 at % or less.

The strain-sensitive resistive film 30 may contain O as an unavoidable impurity in an amount of 10 at % or less with respect to the total amount of Cr, Al, N, and O. When the amount of O as an unavoidable impurity is 10 at % or less, the gauge factor $k_d$ in the temperature range of −50° C. or more and 450° C. or less can be further increased.

Moreover, the strain-sensitive resistive film 30 may contain a trace amount of metals other than Cr and Al or nonmetallic elements. Examples of metals other than Cr and Al and nonmetallic elements contained in the strain-sensitive resistive film 30 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn, and rare earth elements.

The strain-sensitive resistive film 30 has an absolute value of $TCR_d$ of less than 2000 ppm/° C., preferably 1500 ppm/° C. or less, in the temperature range of −50° C. or more and 450° C. or less. When the $TCR_d$ of the strain-sensitive resistive film 30 is controlled within the above-mentioned range, changes in the resistance value of the strain-sensitive resistive film 30 due to temperature change can be small over a wide range from low-temperature regions to high-temperature regions. This makes it possible to reduce the temperature correction error in the strain measurement section S1 and to detect strain with high accuracy.

The strain-sensitive resistive film 30 has a gauge factor $k_d$ of 3 or more, preferably 4 or more, in the temperature range of −50° C. or more and 450° C. or less. In the strain-sensitive resistive film 30, the larger the gauge factor $k_d$ is, the larger the amount of change in resistance value with respect to strain is. Thus, when the strain-sensitive resistive film 30 has a gauge factor $k_d$ of 4 or more, it is possible to improve the resolution of strain measurement in the range of −50° C. or more and 450° C. or less. Note that, the upper limit value of the gauge factor $k_d$ is not limited.

Also, the strain-sensitive resistive film 30 has an absolute value of $TCS_d$ of 2000 ppm/° C. or less, preferably 1000 ppm/° C. or less, more preferably 500 ppm/° C. or less, in the temperature range of −50° C. or more and 450° C. or less. When $TCS_d$ of the strain-sensitive resistive film 30 is controlled within the above-mentioned range, sensitivity changes in the strain-sensitive resistive film 30 due to temperature change can be small over a wide range from low-temperature regions to high-temperature regions. This makes it possible to reduce the temperature correction error in the strain measurement section S1 and to detect strain with high accuracy.

Note that, $TCR_d$, $k_d$, and $TCS_d$ are basically dependent on the main component composition of the strain-sensitive resistive film 30, but may also change depending on trace elements in the strain-sensitive resistive film 30 and/or manufacturing conditions of heat treatment or so.

The thickness of the strain-sensitive resistive film 30 is not limited and can be, for example, 1 nm to 1000 nm, preferably about 50 nm to 500 nm.

Note that, the arrangement of the strain-sensitive resistive film 30 (RD) on the outer surface 22*b* of the membrane 22 is not limited, but is desirably close to the center of the outer surface 22*b* as much as possible. As shown in the upper view of FIG. 2, in the membrane 22, a larger strain occurs at a position closer to the center of the outer surface 22*b*, and strain becomes zero at the outer edge of the outer surface 22*b* in contact with the side wall of the stem 20. In FIG. 2, among of the four temperature-sensitive resistive films 40, RD1 and RD3 are arranged on a first circumference 24 where a predetermined strain characteristic ε1 occurs, and RD2 and RD4 are arranged on a second circumference 26 where a predetermined strain characteristic ε2 different from the strain characteristic ε1 occurs. When a plurality of strain-sensitive resistive films 30 (RD) is formed, the arrangement of the strain-sensitive resistive films 30 may be determined by dividing them into a plurality of resistance groups as described above, or all of the strain-sensitive resistive films 30 may be arranged on the same circumference.

(Temperature-Sensitive Resistive Film 40)

The temperature-sensitive resistive film 40 is made of a material different from that of the strain-sensitive resistive film 30 and has an absolute value of $TCR_t$ of 2000 ppm/° C. in the temperature range of −50° C. or more and 450° C. or less. In the temperature-sensitive resistive film 40, when $TCR_t$ is 2000 ppm/° C. or more, the amount of change in resistance value with respect to temperature change becomes large. Thus, when the temperature-sensitive resistive film 40 with 2000 ppm/° C.≤$TCR_t$ is employed, the temperature of fluid can be detected with high accuracy in the range of −50° C. or more and 450° C. or less. As mentioned above, since the larger $TCR_t$ is the larger the amount of resistance change with respect to a temperature change of 1° C. becomes, the upper limit of $TCR_t$ is not limited.

Examples of the material of the temperature-sensitive resistive film 40 having $TCR_t$ of 2000 ppm/° C. or more include transition metals and alloys containing one or more transition metals. In particular, the temperature-sensitive resistive film 40 is preferably a metal film containing one or more elements selected from Fe, Ni, Cu, and Pt.

The thickness of the temperature-sensitive resistive film 40 is not limited and can be, for example, 1 nm to 1000 nm, preferably about 50 nm to 500 nm.

The temperature-sensitive resistive film 40 preferably has a gauge factor $k_t$ of 4 or less, more preferably 3 or less, in the temperature range of −50° C. or more and 450° C. or less. Note that, the lower limit value of the gauge factor $k_t$ is not limited, and $0<k_t$ is satisfied. In the temperature-sensitive resistive film 40, when the gauge factor $k_t$ is low, the change in resistance value of the temperature-sensitive resistive film 40 due to strain can be small over a wide range from low-temperature regions to high-temperature regions, and resolution of temperature measurement is improved.

Also, preferably, the temperature-sensitive resistive film 40 has an absolute value of $TCS_t$ of 500 ppm/° C. or less in the temperature range of −50° C. or more and 450° C. or less. Note that, $TCR_t$, $k_t$, and $TCS_t$ are basically dependent on the main component composition of the temperature-sensitive resistive film 40, but may also change depending on trace elements in the temperature-sensitive resistive film 40 and/or manufacturing conditions of heat treatment or so.

In the present embodiment, the arrangement of the temperature-sensitive resistive film 40 needs to be determined in consideration of various characteristics of the resistive film. In conventional pressure sensors or so, used is a technique in which a resistor for temperature compensation is provided at a position where no strain is applied, such as at the outer edge of the membrane. At a position where no strain is applied, however, the temperature of fluid is also difficult to be transmitted, resulting in a difference between the actual fluid temperature and the detected temperature. Thus, in the composite sensor 10, which simultaneously detects the temperature and pressure of the fluid, the temperature-sensitive resistive film 40 is arranged in the region where strain occurs on the outer surface 22*b* of the membrane 22.

If the temperature-sensitive resistive film 40 is provided in a strain generation region, however, the resistance value of the temperature-sensitive resistive film 40 changes not only due to temperature but also due to strain, which affects the resolution of temperature measurement and the resolution of strain measurement. Thus, in the composite sensor 10 of the present embodiment, the characteristics (i.e., material and manufacturing conditions) and installation location of the temperature-sensitive resistive film 40 are preferably determined so that Conditional Expression 1 and/or Conditional Expression 2 shown below are/is satisfied.

Specifically, preferably, the temperature-sensitive resistive film 40 satisfies Conditional Expression 1: $TCR_t \geq (2.5 \times k_t \times \varepsilon_t)$. When Conditional Expression 1 described above is converted, $1 \leq \{TCR_t/(2.5 \times k_t \times \varepsilon_t)\}$ is obtained. Here, $\varepsilon_t$ in Conditional Expression 1 is a maximum amount of strain applied to the installation location of the temperature-sensitive resistive film 40. $\varepsilon_t$ can be determined by simulation based on information such as the material, size, and shape of the membrane 22 including each of the resistive films 30 and 40 and the base insulating layer 60. When the temperature-sensitive resistive film 40 satisfies Conditional Expression 1, the resolution of temperature measurement in the range of −50° C. or more and 450° C. or less can be 1° C. or less. Note that, the resolution of temperature measurement means a minimum detectable temperature change, and it can be said that the smaller the value is, the more favorable the resolution is.

Also, preferably, the temperature-sensitive resistive film 40 satisfies Conditional Expression 2: $TCR_t \geq (10 \times k_t \times \varepsilon_t)$, provided that the strain-sensitive resistive film 30 has a gauge factor $k_d$ of 4 or more. When Conditional Expression 2 is converted, $1 \leq \{TCR_t/(10 \times k_t \times \varepsilon_t)\}$ is obtained. Here, in the measurement of strain, the amount of change in resistance due to measurement error of the temperature-sensitive resistive film 40 is defined as $\Delta R_{\Delta T}$. When the strain-sensitive resistive film 30 has a gauge factor $k_d$ of 4 or more and the temperature-sensitive resistive film 40 satisfies Conditional Expression 2, $\Delta R_{\Delta T}$ can be small. As a result, the resolution of strain measurement in the range of −50° C. or more and 450° C. or less can be 200με or less. The resolution of strain measurement means a minimum detectable strain amount, and it can be said that the smaller the value is, the more favorable the resolution is.

Next, a method of manufacturing a membrane 22 (stem 20) including resistive films 30 and 40 is described. First, a hollow cylindrical stem 20 can be manufactured by subjecting a metal plate, such as a stainless steel plate, to machining, such as pressing. At this time, the stem 20 is processed so that an end wall of the stem 20, which becomes the membrane 22, is thinner than other parts. Then, a base insulating layer 60 is formed on an outer surface 22*b* of the membrane 22 by a vapor deposition method, such as CVD.

After the base insulating layer 60 is formed, a strain-sensitive resistive film 30, a temperature-sensitive resistive film 40, and an electrode portion 50 are formed on the base insulating layer 60. First, each of the resistive films 30 and 40 is formed by a thin film method, such as sputtering using a DC sputtering device or an RF sputtering device, vapor deposition, or the like. The formation order of the strain-sensitive resistive film 30 and the temperature-sensitive resistive film 40 is not limited, and after each of the resistive films 30 and 40 is formed, microfabrication is performed using semiconductor processing techniques, such as laser processing and screen printing, to control the formation positions and planar shapes of the resistive films 30 and 40.

Note that, at the time of forming the strain-sensitive resistive film 30, residual O (oxygen) and N (nitrogen) that cannot be completely removed from a reaction chamber may be incorporated into the strain-sensitive resistive film 30. The amount of O and N in the composition of the strain-sensitive resistive film 30 may be determined by the O and N incorporated at the time of film formation as described above. Instead, the amount of O and N in the composition of the strain-sensitive resistive film 30 may be controlled by using oxygen gas and/or nitrogen gas as an atmospheric gas at the time of film formation or annealing and intentionally controlling the introduction amount of oxygen gas and nitrogen gas.

Preferably, after the strain-sensitive resistive film 30 is formed, this resistive film is subjected to a heat treatment. The heat treatment temperature at this time is not limited and can be, for example, 50° C. to 550° C., preferably 350° C. to 550° C.

After each of the resistive films 30 and 40 is formed in a predetermined pattern, the electrode portion 50 is formed at a position as shown in FIG. 2 so as to be electrically connected to each of the resistive films 30 and 40. The electrode portion 50 can be formed by a thin film method, such as sputtering and vapor deposition, as in the resistive films 30 and 40. The material of the electrode portion 50 can be a conductive metal or alloy and preferably includes, for example, Cr, Ti, Ni, Mo, platinum group elements, etc. Also, the electrode portion 50 may have a multilayer structure made of different materials.

By the above-mentioned method, a membrane 22 (stem 20) including a strain measurement section S1 and a temperature measurement section S2 is obtained.

Hereinabove, an embodiment of the present disclosure is described, but the present disclosure is not limited to the above-mentioned embodiment at all and may variously be modified within the scope of the gist of the present disclosure.

Examples

Hereinafter, the present disclosure is described based on more detailed examples, but the present disclosure is not limited to these examples. Note that, in the tables shown below, sample numbers marked with * are comparative examples.

Experiment 1

In Experiment 1, Sample 1, Sample 2, and Samples 3 and 4 were prepared. Sample 1 had a CrN based strain-sensitive resistive film. Sample 2 had a CrAl based strain-sensitive resistive film. Samples 3 and 4 had a CrAlN based strain-sensitive resistive film. Then, a film composition, a temperature coefficient of resistance ($TCR_d$), a gauge factor $k_d$, and a temperature coefficient of sensitivity ($TCS_d$) were measured for each of the prepared samples.

Preparation of Samples

First, a Si substrate was heated to form a $SiO_2$ film as a thermally oxidized film on the surface of the substrate. After that, a strain-sensitive resistive film was formed on the surface of the $SiO_2$ film using a DC sputtering device. Moreover, the formed strain-sensitive resistive film was subjected to a heat treatment at 350° C., and a strain-sensitive resistor (RD) constituting a Wheatstone bridge circuit was thereafter formed by microfabrication. Finally, an electrode portion was formed on the surface of the strain-sensitive resistive film by electron vapor deposition to obtain a sample of the strain-sensitive resistive film for characteristic evaluation.

Note that, in the film formation of the strain-sensitive resistive film, the Al content was controlled by adjusting the number of Cr targets and Al targets used in the DC sputtering device and the potential of each target. Also, Ar gas and a trace amount of nitrogen gas were used as atmospheric gases during film formation, and the N content was controlled by the proportion of the nitrogen gas in the atmospheric gases. Also, the thickness of the strain-sensitive resistive film was 300 nm in all samples.

Compositional Analysis

The compositions of the strain-sensitive resistive films in Samples 1 to 4 were analyzed by X-ray fluorescence (XRF) method.

Measurement of Temperature Coefficient of Resistance

For each of Samples (Samples 1 to 4), a resistance value was measured while changing the temperature of the measurement environment from −50° C. to 450° C., and a graph showing the tendency of change in resistance value with respect to temperature change was obtained. Then, a slope A of this graph was determined by linear approximation using the least squares method, and $TCR_d$ of each sample was calculated from the slope A. The reference temperature of $TCR_d$ was 25° C.

Measurement of Gauge Factor and Temperature Coefficient of Sensitivity

Figure 4:
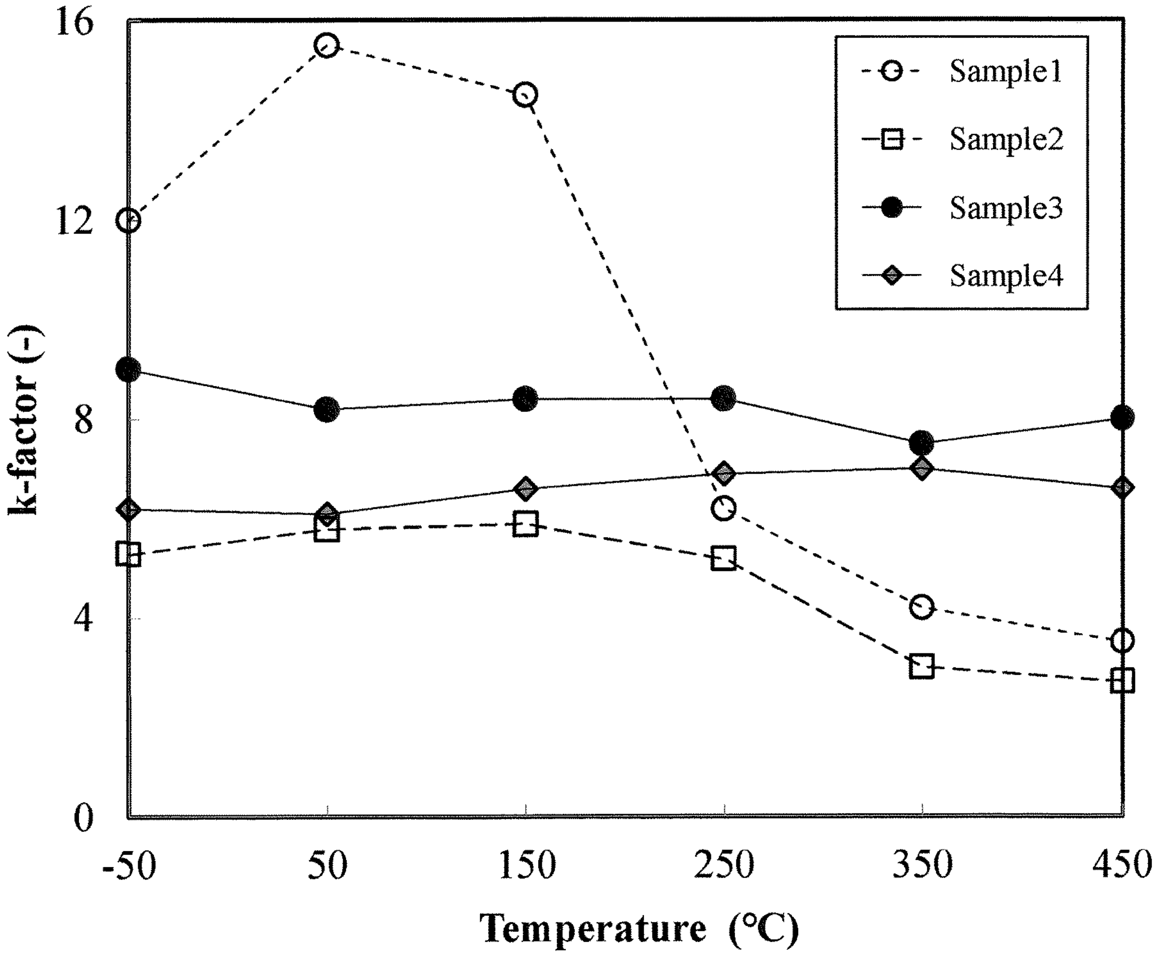
FIG. 4 is a graph showing a relation between gauge factor and temperature of a strain-sensitive resistive film.

For each of Samples (Samples 1 to 4), a gauge factor $k_d$ was measured while changing the temperature of the measurement environment from −50° C. to 450° C., and a graph showing the tendency of change in gauge factor $k_d$ with respect to temperature change as shown in FIG. 4 was obtained. Then, a slope B of this graph was determined by linear approximation using the least squares method, and $TCS_d$ of each sample was calculated from the slope B. The reference temperature of $TCS_d$ was 25° C.

The compositional analysis results, $TCR_d$, gauge factor $k_d$, and $TCS_d$ of each sample are shown in Table 1 and FIG. 4.

TABLE 1

| | Composition of Strain-Sensitive Resistive Film | | | Temperature Coefficient of Resistance | Temperature Coefficient of Sensitivity |
|---|---|---|---|---|---|
| Sample No. | Cr at % | Al at % | N at % | $TCR_d$ ppm/° C. | $TCS_d$ ppm/° C. |
| Sample 1* | 95 | — | 5 | 1219 | −1716 |
| Sample 2* | 95 | 5 | — | −2 | −1157 |
| Sample 3 | 81 | 14 | 5 | −708 | −255 |
| Sample 4 | 55 | 35 | 10 | −1263 | 292 |

As shown in Table 1 and FIG. 4, in Sample 1 of the CrN based alloy film, a high gauge factor was obtained in the low temperature range of −50° C. to 150° C., but the gauge factor was extremely low in the high temperature range of 200° C. or more. Thus, it was found that when a CrN based alloy film is used as a strain-sensitive resistive film, pressure measurement accuracy cannot be obtained in a high temperature range of 200° C. or more. In Sample 2, Al was contained, but the Al content was 5 at % or less, the gauge factor was low in a high temperature range of 200° C. or more, and a stable gauge factor could not be obtained.

On the other hand, in Samples 3 and 4, which used a CrAlN alloy film expressed by a formula of $Cr_{(100-x-y)}Al_xN_y$ and satisfying $5<x\leq50$ and $0.1\leq y\leq20$, a high gauge factor was stably obtained in a range of −50° C. to 450° C. From this result, it was found that when a CrAlN alloy film satisfying a predetermined composition is used as a strain-sensitive resistive film, pressure can be measured with high accuracy in the range of −50° C. to 450° C.

Experiment 2

Figure 5:
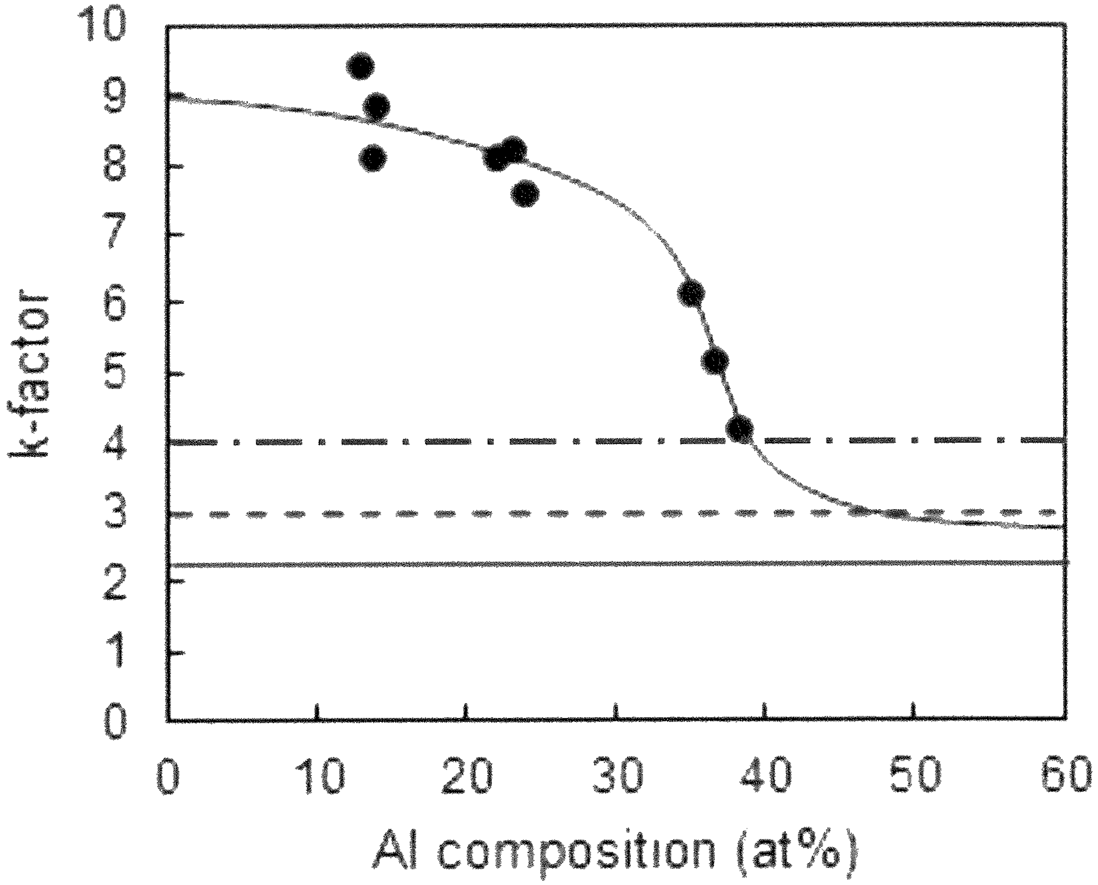
FIG. 5 is a graph showing a relation between Al content and gauge factor of a strain-sensitive resistive film.

In Experiment 2, for the purpose of evaluating the relation between composition range and gauge factor for a strain-sensitive resistive film 30 expressed by a formula of $Cr_{(100-x-y)}Al_xN_y$, nine samples having different Al contents (value of x) were prepared. Then, a composition (Al content) and a gauge factor $k_d$ at 25° C. of each sample were measured. The method of preparing each sample and the method of measuring the gauge factor in Experiment 2 were the same as those in Experiment 1. The evaluation results of Experiment 2 are shown in FIG. 5. In FIG. 5, the measurement results of each sample in Experiment 2 are plotted with the horizontal axis representing the Al content and the vertical axis representing the gauge factor $k_d$ of the strain-sensitive resistive film 30. Note that, although the N content is not shown in FIG. 5, $0.1\leq y\leq20$ was satisfied in all of Samples of Experiment 2.

As shown in FIG. 5, it was found that the sample with $x\leq50$ has a sufficiently high gauge factor compared to 2.6, which is a gauge factor of normal metals, and can be advantageously used as the strain-sensitive resistive film 30. In particular, it was found that when the Al content is $x\leq40$, the gauge factor $k_d$ is 4 or more, and the sensitivity of pressure measurement is favorable.

Experiment 3

Figure 6:
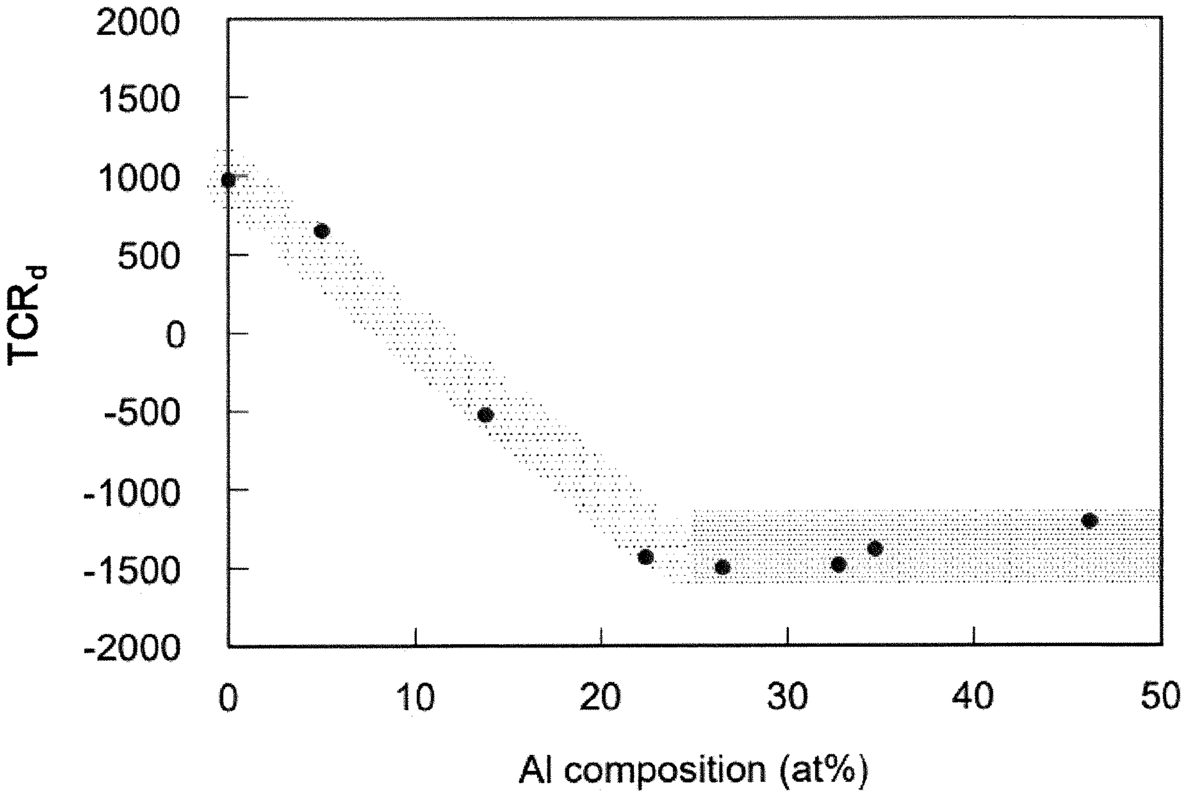
FIG. 6 is a graph showing a relation between Al content and $TCR_d$ of a strain-sensitive resistive film.

In Experiment 3, for the purpose of evaluating the relation between composition range and $TCR_d$ for a strain-sensitive resistive film 30 expressed by a formula of $Cr_{(100-x-y)}Al_xN_y$, eight samples having different Al contents (value of x) were prepared. Then, a composition (Al content) and $TCR_d$ of each sample were measured. The method of preparing each sample and the method of measuring $TCR_d$ in Experiment 3 were the same as those in Experiment 1. The evaluation results of Experiment 3 are shown in FIG. 6. In FIG. 6, the measurement results of each sample in Experiment 3 are plotted with the horizontal axis representing the Al content and the vertical axis representing $TCR_d$. Note that, although the N content is not shown in FIG. 6, $0.1\leq y\leq20$ is satisfied in all of Samples of Experiment 3.

As shown in FIG. 6, in four samples with an Al content of $0\leq x\leq25$, the slope of $TCR_d$ with the unit composition change of Al (horizontal axis) was large, and the absolute value of the slope calculated by linearly approximating plots using the least squares method was 105. On the other hand, in four samples with an Al content of $25<x\leq50$, the slope of $TCR_d$ with the unit composition change of Al (horizontal axis) was small, and the absolute value of the slope calculated by linearly approximating plots using the least squares method was 16.

That is, it was found that, in the samples with an Al content of $25<x\leq50$, the change rate in $TCR_d$ with respect to a change in Al content of 1 at % can be reduced to less than 5%, and characteristic changes due to composition changes can be reduced significantly.

Experiment 4

In Experiment 4, four samples (Samples 5 to 8) including a strain-sensitive resistive film 30 and a temperature-sensitive resistive film 40 were prepared.

Sample 5

Specifically, in Sample 5, a strain-sensitive resistive film 30 expressed by a formula of $Cr_{(100-x-y)}Al_xN_y$ and satisfying $5<x\leq50$ and $0.1\leq y\leq20$ was formed on the surface of a $SiO_2$ film of a Si substrate using a DC sputtering device. Then, the strain-sensitive resistive film 30 was subjected to a heat treatment at 350° C. and thereafter subjected to a microfabrication to form a Wheatstone bridge circuit. A temperature-sensitive resistive film 40 was formed at a position where the maximum strain amount $\varepsilon_t$ was 200με. In Sample 5, the temperature-sensitive resistive film 40 was expressed by a formula of $Cr_{(100-x-y)}Al_xN_y$, satisfied $5<x\leq50$ and $0.1\leq y\leq20$, and had the same composition as the strain-sensitive resistive film 30. Finally, an electrode portion was formed by electron vapor deposition, and Sample 5 as a temperature-sensitive and strain-sensitive composite sensor was obtained.

Sample 6

In Sample 6, formed were a temperature-sensitive resistive film 30 expressed by a formula of $Cr_{(100-x-y)}Al_xN_y$ and satisfying $5<x\leq50$ and $0.1\leq y\leq20$ and a temperature-sensitive resistive film 40 made of a Pt based alloy thin film. In Sample 6, the composition of each resistive film was different from that of Sample 5, but the experimental conditions other than the composition were the same as those of Sample 5.

Sample 7

In Sample 7, formed were a temperature-sensitive resistive film 30 expressed by a formula of $Cr_{(100-x-y)}Al_xN_y$ and satisfying $5<x\leq50$ and $0.1\leq y\leq20$ and a temperature-sensitive resistive film 40 made of a Cu based alloy thin film. In Sample 7, the composition of each resistive film was different from that of Sample 5, but the experimental conditions other than the composition were the same as those of Sample 5.

Sample 8

In Sample 8, formed were a temperature-sensitive resistive film 30 expressed by a formula of $Cr_{(100-x-y)}Al_xN_y$ and satisfying $5<x\leq50$ and $0.1\leq y\leq20$ and a temperature-sensitive resistive film 40 made of a Ni based alloy thin film. In Sample 8, the composition of each resistive film was different from that of Sample 5, but the experimental conditions other than the composition were the same as those of Sample 5.

In each of Samples 5 to 8 of Experiment 4, the temperature coefficient of resistance, gauge factor, and temperature coefficient of sensitivity of each of the resistive films 30 and 40 were measured in the same manner as in Experiment 1. Also, in each sample, a resolution of temperature measurement and a resolution of strain measurement in the range of −50° C. to 450° C. were calculated. Regarding the resolution of temperature measurement, a pass (G) was determined when a resolution of 1° C. or less was always obtained in the temperature range of −50° C. to 450° C., and a failure (F) was determined when a resolution was more than 1° C. in the temperature range of −50° C. to 450° C. The evaluation results of Experiment 4 are shown in Table 2. Note that, the gauge factors ($k_d$, $k_t$) shown in Table 2 are the measurement results at 25° C.

temperature measurement was poor, and the temperature change of 1° C. could not be accurately measured when the temperature-sensitive resistive film 40 was placed at a location where $\varepsilon_t$ was 200με. Also, in Sample 5, in the strain measurement, the resistance change amount $\Delta R_{\Delta T}$ due to the measurement error of the temperature-sensitive resistive film 40 was large, and the resolution of the strain measurement was 400με. That is, in Sample 5, it was not possible to detect a strain amount of less than 400με, and the accuracy of strain measurement could not be obtained.

Meanwhile, in Samples 6 to 8, a metal film having a composition different from that of the strain-sensitive resistive film 30 and having a $TCR_t$ of 2000 ppm/° C. or more was used as the temperature-sensitive resistive film 40. In Samples 6 to 8, the resolution of temperature measurement was always 1° C. or less in the temperature range of −50° C. to 450° C., and temperature measurement was possible with sufficient accuracy. Also, the resolution of strain measurement was 200με or less, and the accuracy of strain measurement was improved in Samples 6 to 8 compared to Sample 5.

Note that, by comparing the evaluation results of Samples 6 to 8, it was found that the higher $TCR_t$ of the temperature-sensitive resistive film 40 is, the further the resolution of temperature measurement and the resolution of strain measurement are improved. Also, it was found that the lower the gauge factor $k_t$ of the temperature-sensitive resistive film 40 is, the further the resolution of temperature measurement and the resolution of strain measurement are improved.

Experiment 5

In Experiment 5, prepared were nine samples in which the material and installation location of a temperature-sensitive resistive film 40 were changed. The method of preparing the samples in Experiment 5 was the same as that in Experiment 4. Then, in each of the samples in Experiment 5, a resistance change amount ΔR" of the temperature-sensitive resistive film 40 at the time of application of a maximum strain amount $F_t$ to the installation location was measured. The measurement of ΔR" of each sample was carried out at environmental temperatures of −50° C., 25° C., and 450° C. The evaluation results of Experiment 5 are shown in FIG. 7.

Figure 7:
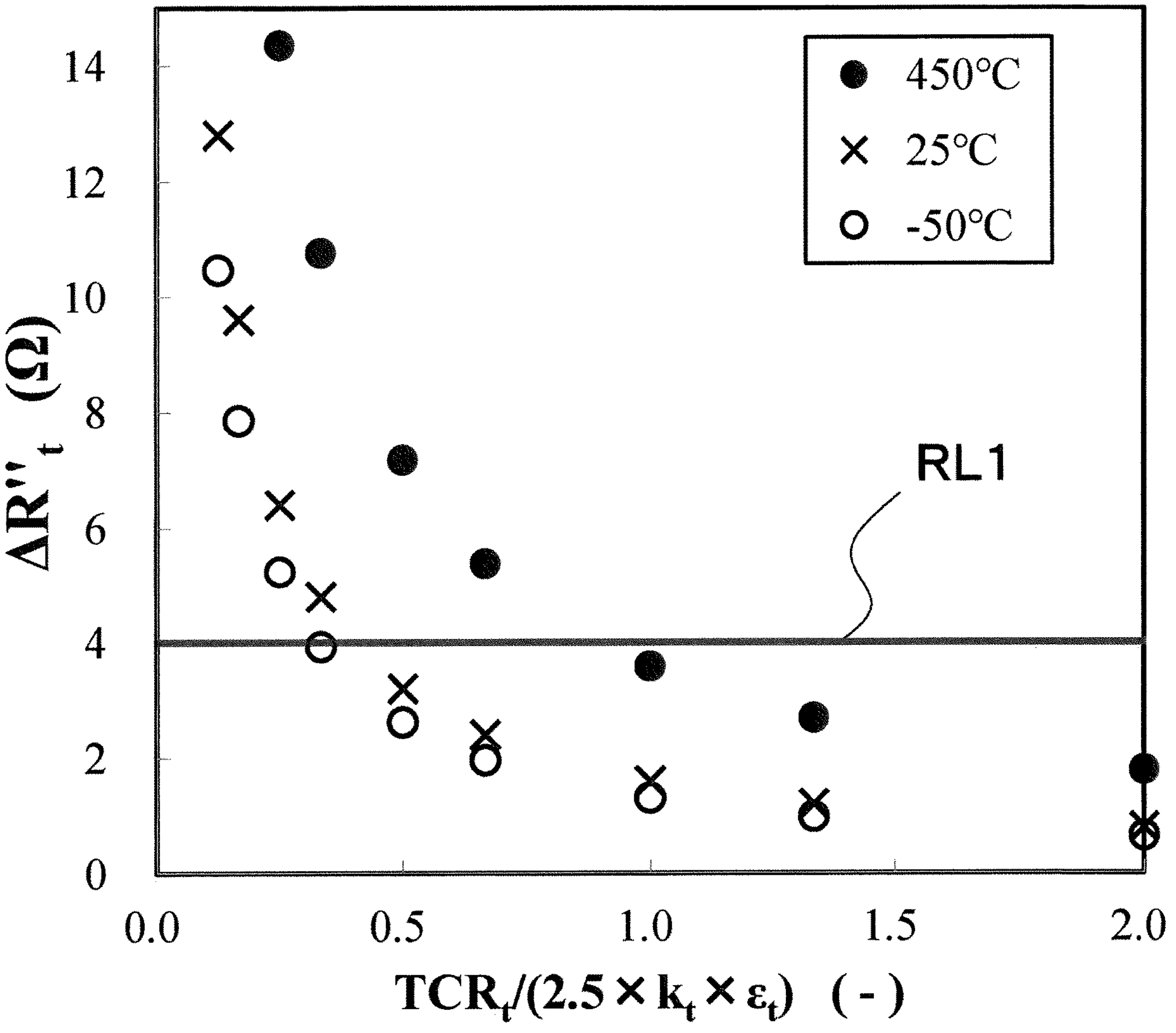
FIG. 7 is a graph showing a relation between a predetermined conditional expression 1 and an amount of resistance change of a temperature-sensitive resistive film at the time of application of a maximum amount of strain $F_t$ to the installation location.

In FIG. 7, the measurement results of each sample are plotted with the horizontal axis representing $TCR_t/(2.5\times k_t\times\varepsilon_t)$ corresponding to Conditional Expression 1 and the vertical axis representing $\Delta R''_t$. It can be said that the smaller $\Delta R''_t$ is, the more favorable the resolution of temperature measurement is. More specifically, the reference line RL1 shown in FIG. 7 is a resistance change amount ΔR' of the temperature-sensitive resistive film 40 caused by a temperature change of 1° C. If a plot of the measurement results is below the reference line RL1 (i.e., $\Delta R''_t<\Delta R'$), the resistance change amount due to temperature change is larger than the

TABLE 2

| Sample No. | Strain-Sensitive Resistive Film: Material (—) | $TCR_d$ (ppm/° C.) | $k_{d\_25°\,C.}$ (—) | $TCS_d$ (ppm/° C.) | Temperature-Sensitive Resistive Film: Material (—) | $TCR_t$ (ppm/° C.) | $k_{t\_25°\,C.}$ (—) | $TCS_t$ (ppm/° C.) | Resolution of Temperature Measurement For G | Resolution of Strain Measurement (με) |
|---|---|---|---|---|---|---|---|---|---|---|
| Sample 5* | CrAlN Film | −1500 | 8 | 500 | CrAlN Film | −1500 | 8 | 500 | F | 400 |
| Sample 6 | CrAlN Film | −1500 | 4 | 500 | Pt based metal film | 2000 | 4 | 500 | G | 200 |
| Sample 7 | CrAlN Film | −1200 | 4 | 500 | Cu based metal film | 3000 | 3 | 500 | G | 100 |
| Sample 8 | CrAlN Film | −1500 | 8 | 500 | Ni based metal film | 2000 | 2 | 500 | G | 50 |

As shown in Table 2, in Sample 5 (the strain-sensitive resistive film 30 and the temperature-sensitive resistive film 40 were made of the same material), the resolution of resistance change amount due to the maximum strain amount $\varepsilon_t$, and the temperature change of 1° C. can be measured. That is, if all of the plots at −50° C., 25° C., and 450° C. are below the reference line RL1, it can be determined that the resolution of temperature measurement is always 1° C. or less in the range of −50° C. to 450° C.

As shown in FIG. 7, in the range of $0.5 \le \{TCR_t/(2.5 \times k_t \times \varepsilon_t)\} < 1.0$, the plot at −50° C. and the plot at 25° C. were below the reference line RL1. However, the plot at 450° C. was above the reference line RL1, and a resolution of 1° C. or less was not obtained in a high temperature range of 450° C.

On the other hand, in the range of $1.0 \le \{TCR_t/(2.5 \times k_t \times \varepsilon_t)\}$, all plots at −50° C. to 450° C. were below the reference line RL1, and a resolution of 1° C. or less was always obtained in the range of −50° C. to 450° C.

Experiment 6

In Experiment 6, prepared were seven samples in which the material and installation location of a temperature-sensitive resistive film 40 were changed. The method of preparing the samples in Experiment 6 was the same as that in Experiment 4. Then, in each of the samples in Experiment 6, a resistance change amount $\Delta R_{\Delta T}$ due to a measurement error of the temperature-sensitive resistive film 40 was calculated. The evaluation results of Experiment 6 are shown in FIG. 8.

Figure 8:
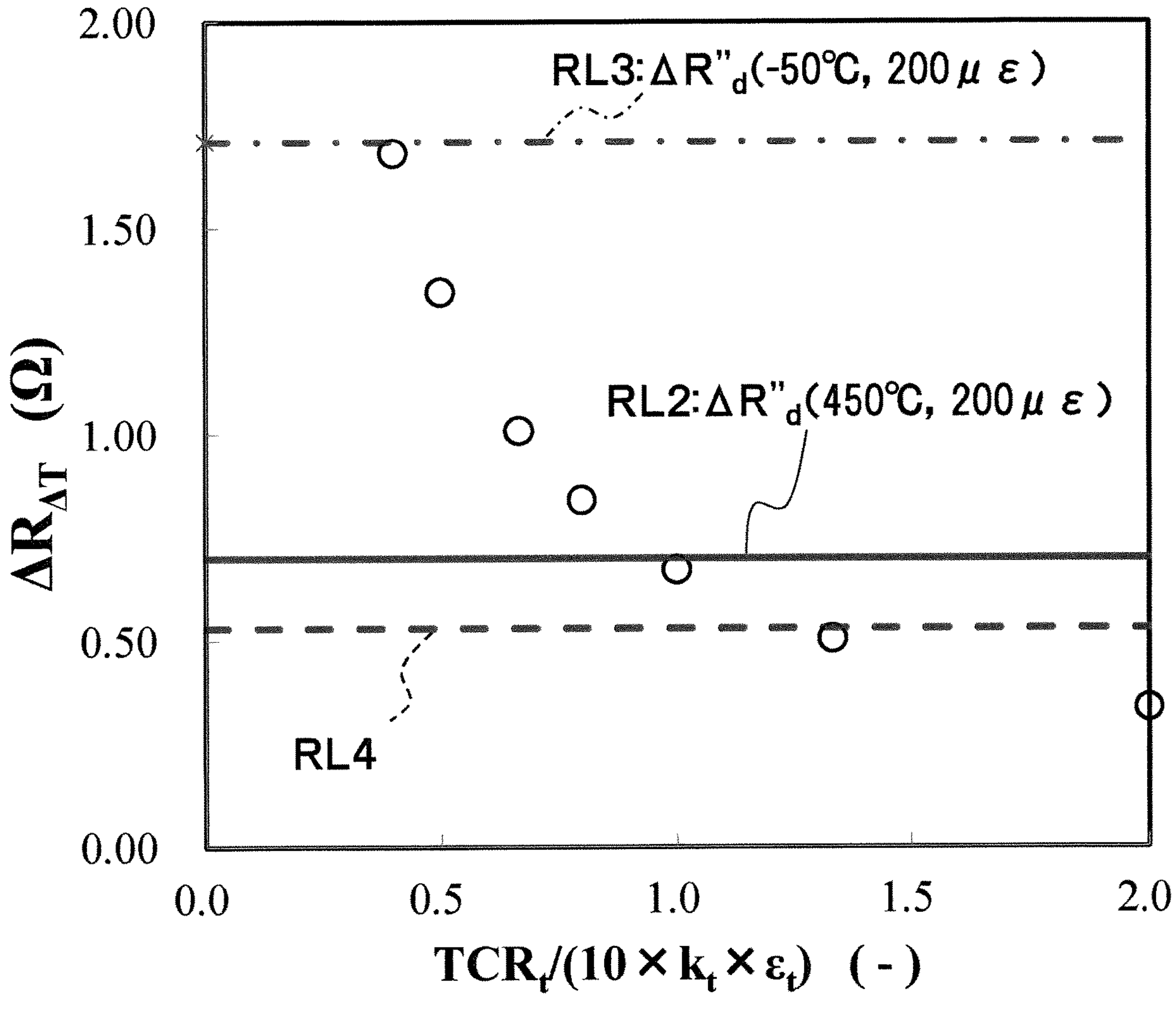
FIG. 8 is a graph showing a relation between a predetermined conditional expression 2 and $\Delta R_{\Delta T}$.

In FIG. 8, the measurement results of each sample are plotted with the horizontal axis representing $TCR_t/(10 \times k_t \times \varepsilon_t)$ corresponding to Conditional Expression 2 and the vertical axis representing $\Delta R_{\Delta T}$. The reference line RL2 shown in FIG. 8 is a resistance change amount $\Delta R''_d$ generated when a strain-sensitive resistive film 30 with $k_d=4$ was subjected to a strain of 200με at 450° C. Likewise, the reference line RL3 is a resistance change amount $\Delta R''_d$ generated when the strain-sensitive resistive film 30 with $k_d=4$ was subjected to a strain of 200με at −50° C. In the measurement of strain, if the resistance change amount $\Delta R''_d$ at the time of application of a predetermined strain $\varepsilon_n$ to the strain-sensitive resistive film 30 is larger than $\Delta R_{\Delta T}$, the predetermined strain $\varepsilon_n$ can be detected accurately. That is, if the plot of $\Delta R_{\Delta T}$ is below both of the reference lines RL2 and RL3, a resolution of 200με or less is always obtained in the temperature range of −50° C. to 450° C.

As shown in FIG. 8, in the range of $0.4 \le \{TCR_t/(10 \times k_t \times \varepsilon_t)\} < 1.0$, $\Delta R_{\Delta T}$ was below the reference line RL3, but was above the reference line RL2. That is, when $0.4 \le \{TCR_t/(10 \times k_t \times \varepsilon_t)\} < 1.0$ is satisfied, a strain of 200με can be detected at −50° C., but a strain of 200με cannot be detected at 450° C.

On the other hand, $\Delta R_{\Delta T}$ was below both of the reference lines RL2 and RL3 in the range of $1.0 \le \{TCR_t/(10 \times k_t \times \varepsilon_t)\}$, and it was found that a resolution of 200με or less was always obtained in the range of −50° C. to 450° C.

Note that, the reference line RL4 shown in FIG. 8 is a resistance change amount $\Delta R''_d$ generated when the strain-sensitive resistive film 30 with $k_d=3$ was subjected to a strain of 200με at 450° C. It was found that when the strain-sensitive resistive film 30 with $k_d=3$ having a gauge factor of less than 4 is used, a resolution of 200με or less is obtained by satisfying $1.3 \le \{TCR_t/(10 \times k_t \times \varepsilon_t)\}$.

REFERENCE NUMERALS

10 . . . temperature-sensitive and strain-sensitive composite sensor
12 . . . connection member
**12*a*** . . . screw groove
**12*b*** . . . flow path
14 . . . holding member
70 . . . circuit board
82 . . . intermediate wiring
20 . . . stem
21 . . . flange portion
22 . . . membrane
**22*a*** . . . inner surface
**22*b*** . . . outer surface
30 . . . strain-sensitive resistive film
40 . . . temperature-sensitive resistive film
50 . . . electrode portion
60 . . . base insulating layer

What is claimed is:

1. A temperature-sensitive and strain-sensitive composite sensor comprising:

a strain-sensitive resistive film represented by a formula of $Cr_{(100-x-y)}Al_xN_y$, $5 < x \le 50$ and $0.1 \le y \le 20$ being satisfied; and a temperature-sensitive resistive film having an absolute value of temperature coefficient of resistance (TCR) of 2000 ppm/° C. or more in a temperature range of −50° C. or more and 450° C. or less, wherein the temperature-sensitive resistive film has an absolute value of temperature coefficient of sensitivity (TCS) of 500 ppm/° C. or less in the temperature range of −50° C. or more and 450° C. or less.

2. The temperature-sensitive and strain-sensitive composite sensor according to claim 1, wherein $TCR_t \ge (2.5 \times k_t \times \varepsilon_t)$ is satisfied, where $TCR_t$ is a temperature coefficient of resistance of the temperature-sensitive resistive film, $k_t$ is a gauge factor of the temperature-sensitive resistive film, and $\varepsilon_t$ is a maximum amount of strain applied to an installation location of the temperature-sensitive resistive film.

3. The temperature-sensitive and strain-sensitive composite sensor according to claim 1, wherein the strain-sensitive resistive film has a gauge factor $k_d$ of 4 or more in the temperature range of −50° C. or more and 450° C. or less, and $TCR_t \ge (10 \times k_t \times \varepsilon_t)$ is satisfied, where $TCR_t$ is a temperature coefficient of resistance of the temperature-sensitive resistive film, $k_t$ is a gauge factor of the temperature-sensitive resistive film, and $\varepsilon_t$ is a maximum amount of strain applied to an installation location of the temperature-sensitive resistive film.

4. The temperature-sensitive and strain-sensitive composite sensor according to claim 1, wherein composition regions of x and y of the strain-sensitive resistive film are $25 < x \le 50$ and $0.1 \le y \le 20$, respectively.

5. A temperature-sensitive and strain-sensitive composite sensor comprising:

a strain-sensitive resistive film represented by a formula of $Cr_{(100-x-y)}Al_xN_y$, $5 < x \le 50$ and $0.1 \le y \le 20$ being satisfied; and a temperature-sensitive resistive film having an absolute value of temperature coefficient of resistance (TCR) of 2000 ppm/° C. or more in a temperature range of −50° C. or more and 450° C. or less, wherein the strain-sensitive resistive film has a gauge factor $k_d$ of 4 or more in the temperature range of −50° C. or more and 450° C. or less, and $TCR_t \ge (10 \times k_t \times \varepsilon_t)$ is satisfied, where $TCR_t$ is a temperature coefficient of resistance of the temperature-sensitive resistive film, $k_t$ is a gauge factor of the temperature-sensitive resistive film, and $\varepsilon_t$ is a maximum amount of strain applied to an installation location of the temperature-sensitive resistive film.

6. The temperature-sensitive and strain-sensitive composite sensor according to claim 5, wherein composition regions of x and y of the strain-sensitive resistive film are $25<x\leq 50$ and $0.1\leq y\leq 20$, respectively.

7. A temperature-sensitive and strain-sensitive composite sensor comprising:

a strain-sensitive resistive film represented by a formula of $Cr_{(100-x-y)}Al_xN_y$, $25<x\leq 50$ and $0.1\leq y\leq 20$ being satisfied; and a temperature-sensitive resistive film having an absolute value of temperature coefficient of resistance (TCR) of 2000 ppm/° C. or more in a temperature range of −50° C. or more and 450° C. or less.

8. The temperature-sensitive and strain-sensitive composite sensor according to claim 7, wherein $TCR_t\geq(2.5\times k_t\times\varepsilon_t)$ is satisfied, where $TCR_t$ is a temperature coefficient of resistance of the temperature-sensitive resistive film, $k_t$ is a gauge factor of the temperature-sensitive resistive film, and $\varepsilon_t$ is a maximum amount of strain applied to an installation location of the temperature-sensitive resistive film.

* * * * *